(12) United States Patent
Drapkin

(10) Patent No.: US 7,077,718 B1
(45) Date of Patent: Jul. 18, 2006

(54) PROCESS FOR FORMING BEESWAX INTO A PLASTIC ARTICLE

(76) Inventor: Herbert Drapkin, 24835 El Dorado Meadow Rd., Hidden Hills, CA (US) 91302

( * ) Notice: Subject to any disclaimer, the term of this patent is extended or adjusted under 35 U.S.C. 154(b) by 0 days.

(21) Appl. No.: 11/292,623

(22) Filed: Dec. 2, 2005

(51) Int. Cl.
A01K 47/04 (2006.01)

(52) U.S. Cl. ............................. 449/2; 449/44; 449/60; 264/325

(58) Field of Classification Search .................... 449/2, 449/17, 42, 43, 44, 60, 61; 264/7, 128, 325
See application file for complete search history.

(56) References Cited

U.S. PATENT DOCUMENTS

| | | | | |
|---|---|---|---|---|
| 134,411 | A | * 12/1872 | Williams | 449/60 |
| 2,561,147 | A | * 7/1951 | Smith | 449/44 |
| 4,992,073 | A | * 2/1991 | Levy et al. | 449/44 |
| 6,358,340 | B1 * | 3/2002 | Vidal | 156/61 |
| 6,530,819 | B1 * | 3/2003 | Rovera | 449/44 |

* cited by examiner

Primary Examiner—Robert P. Swiatek
(74) Attorney, Agent, or Firm—Thomas I. Rozsa

(57) ABSTRACT

In the prior art, the full honeycombs or the foundations are made with resin and the beekeeper sprays beeswax onto the honeycomb or the foundation in order to have the bees become attracted to the resin or high density polyethylene honeycomb or foundation. The present invention involves the concept of evenly coating the plastic resin pellets with hot melted beeswax so that the coated pellets have the beeswax admixed thereon. Therefore, at the time of the molding of the plastic pellets into a foundation, a foundation with border, or honeycomb, the final molded product will have the beeswax molded therein, so that the bees will automatically be attracted to the honeycomb or the foundation so that they can automatically place their honey into the honeycomb or build the honeycomb right onto the foundation and lay their eggs, raise their brood and deposit honey into the honeycomb. The present invention eliminates the requirement to spray a plastic molded product with beeswax to attract the bees since the beeswax is already molded into the final product.

24 Claims, 5 Drawing Sheets

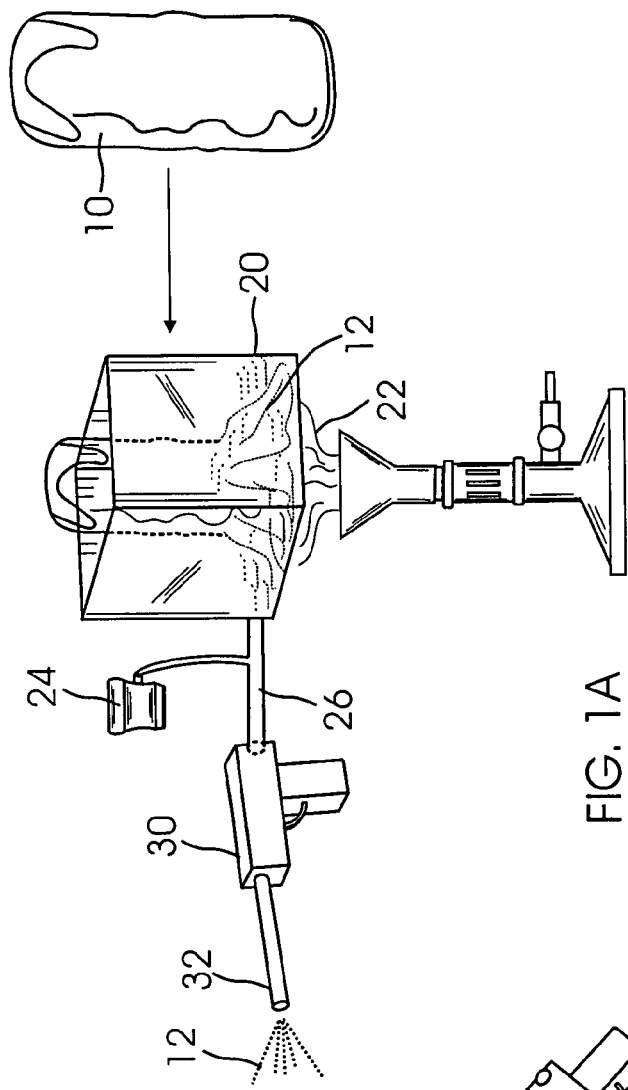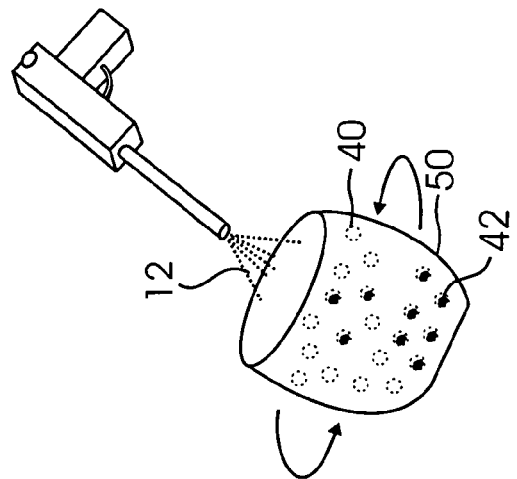
FIG. 1A
FIG. 1B

PROCESS FOR FORMING BEESWAX INTO A PLASTIC ARTICLE

BACKGROUND OF THE INVENTION

1. Field of the Invention

The present invention relates to the field of artificial honeycombs and specifically relates to significant modifications and improvements to molded plastic honeycombs for use in replacing the existing wooden or plastic honeycombs presently in use.

2. Description of the Prior Art

Beekeeping is a very old art but only minor innovations have been made to increase honey production from bees.

The following five (5) patents are relevant to the field of the present invention.

1. U.S. Pat. No. 3,182,339 issued to Auston Roy Ellis on May 11, 1965 for "Artificial Honeycomb" (hereafter the "Ellis Patent");

2. U.S. Pat. No. 4,332,045 issued to Matthias Schmidt on Jun. 1, 1982 for "Method And Apparatus For Economically Maintaining And Breeding Bees in A Bee Compound" (hereafter the "Schmidt Patent");

3. U.S. Pat. No. 4,374,440 issued to Herbert Drapkin on Feb. 22, 1983 for "Honeycomb" (hereafter the "Drapkin Patent");

4. U.S. Pat. No. 4,392,262 issued to Johann R. Stickler on Jul. 12, 1983 for "Apparatus For Breeding Queen Honeybees" (hereafter the "Stickler Patent");

5. Japanese Application Patent No. JP2005058028 issued to Kumabe Masahiro on Mar. 10, 2005 for "Comb Foundation For Honeybee Made Of Paper, Comb Made Of Paper And Bee Hive Made Of Paper" (hereafter the "Masahiro Patent").

The Ellis Patent discloses the creation of a honeycomb made entirely of wax which is made up of hexagonal cells adjoining one another on all sides of the hexagon which imitates a natural honeycomb. This invention is designed to have an entire honeycomb made completely of wax so that it supplements what was then the practice of just taking a common foundation made of wax and having the bees create the honeycomb. This invention created the honeycomb in order to eliminate the problem of the bees having to make the honeycomb on the foundation and therefore, waste honey and energy in making the honeycomb. However, the device made entirely out of beeswax was very soft and fragile. The soft beeswax honeycomb also came apart when the device was placed in a centrifuge to remove the honey from the honeycomb and therefore was not reusable.

The Schmidt Patent discloses a concept for more economically breading bees by creating a compound unit comprising a plurality of compartments that surround and are connected to a central assembly chamber associated with a feeding chamber. Each of the compounds is adapted to house a swarm of bees and one queen bee. Accordingly, bees in an individual compartment are only indirectly accessible to bees in another compartment through the central chamber and can move from one compartment to another only after congregating in the assembly chamber in order to gain access to the feeding chamber associated with the assembly chamber. The innovative concept of this invention is that with conventional wax coated plastic combs, wherein the sidewalls of the cells are of reduced height, bees initially build up the side walls with wax to their full height of the cell walls. Wax from the wax coating on conventional combs is utilized by the bees during this build-up, and the bees retain their own wax until swarming is possible. At that time, they use their own wax for building additional cells.

The Drapkin Patent was invented by the inventor of the present invention and was a significant improvement to beekeeping at the time by providing an artificial molded honeycomb structure which was an accurate simulation of a natural cell so that the bees did not have to spend honey and energy in building a honeycomb on a foundation but instead, since the honeycomb was created for them, upon spraying beeswax onto the honeycomb to attract the bees, the initial energy output from the bees was used entirely to lay eggs, raise their brood and deposit their honey into the formed honeycomb. The complete molded honeycomb as shown in FIG. 8 of this patent includes an array of hexagonal cells of full depth, at a proper angle and having the normal truncated bottom of a natural cell. The honeycomb therefore prevents waste since the honeycomb is almost a perfect simulation of a natural cell and the bee does not have to build up any wax foundation.

The Stickler Patent discloses an apparatus for breeding queen honeybees. The focus of the patent involves a breeding apparatus for honeybees comprising a breeding frame, a honeycomb cell plate affixed thereto and defining a multiplicity of open cells, a like multiplicity of sockets projecting from the rear face of the plate, the cells passing through the sockets, and cup-shaped elements detachably mounted on the sockets for closing the rear of the cells.

The Masahiro Patent is a Japanese patent that issued in March 2005. Specifically, the problem to be solved is to provide a comb foundation made of paper, a comb and a bee hive shipping honeybees for pollination early stages. The solution is to have the comb foundation for the honeybees made of paper which is obtained by forming comb cells from cells of a honey bee core or a roll core made of the paper and coated or impregnated with beeswax. The comb foundation made of the paper is characterized in that the comb foundation made of paper arranged in the interior of the square frame formed of the paper as a material with the cell opening surface transversely directed to the outside is fixed with an adhesive.

As disclosed above, molded plastic honeycombs for use with beekeeping are known in the prior art. In the prior art, the full honeycombs or the foundations are made with resin and the beekeeper sprays beeswax onto the honeycomb or the foundation in order to have the bees be attracted to the resin or high density polyethylene honeycomb or foundation. This is both time-consuming and expensive. There is a significant need for an improved molded resin foundation, foundation with border, or honeycomb for use with beekeeping which eliminates the requirement to spray beeswax onto the device in order for bees to be attracted thereto so that they will lay their eggs, raise their brood and deposit their honey therein.

SUMMARY OF THE INVENTION

In the prior art, the full honeycombs or the foundations are made with resin or paper and the beekeeper sprays beeswax onto the honeycomb or the foundation in order to have the bees become attracted to the resin or high density polyethylene honeycomb or foundation. The present invention involves the concept of evenly coating the plastic resin pellets with hot melted beeswax so that the coated pellets have the beeswax admixed thereon. Therefore, at the time of the molding of the plastic pellets into a foundation, a foundation with border, or honeycomb, the final molded product will have the beeswax molded therein, so that the bees will automatically be attracted to the honeycomb or the foundation so that they can automatically place their honey into the honeycomb or build the honeycomb right onto the foundation and lay the honey into the honeycomb. The present invention eliminates the requirement to spray a plastic molded product with beeswax to attract the bees since the beeswax is already molded into the final product.

It has been discovered, according to the present invention, that if a slab of beeswax is melted so that it becomes liquid and the hot beeswax is thereafter forced into an applicator such as a glue gun, then the glue gun can be used to spray the hot melted beeswax onto resin pellets which are used to form a foundation, foundation with border or honeycomb.

It has further been discovered, according to the present invention, that if the resin pellets are placed into a tumbling device such as a cement mixer while they are being coated with hot melted beeswax, then the coating of hot melted beeswax on the pellets will be even and smooth so that the resin pellets will be evenly coated with beeswax.

It has additionally been discovered, according to the present invention, that if the resin pellets which are evenly coated with hot melted beeswax are thereafter caused to travel from the tumbling device to a tubular elongated barrel having a resin delivery screw which transports the beeswax coated resin pellets into the cavities of the mold after the mold has been closed, then when the cavities of the mold are fully filled with the beeswax coated resin pellets and the cavities of the mold are caused to form the foundation, foundation with border, or honeycomb, the final formed foundation, foundation with border or honeycomb will be molded with the beeswax impregnated and admixed therein. As a result, the bees will be attracted to the final molded product and will thereafter when using a foundation create a honeycomb and deposit their eggs and honey in the formed honeycomb, and when using a fully formed honeycomb will directly lay their eggs and honey in the fully formed honeycomb, and the requirement to spray either the formed foundation or the fully formed honeycomb with beeswax to attract the bees is eliminated.

It is therefore an object of the present invention to take a slab of beeswax and melt it so that it becomes liquid and the hot beeswax is thereafter forced into an applicator such as a glue gun, so that the glue gun can be used to spray the hot melted beeswax onto resin pellets which are used to form a foundation, foundation with border or honeycomb.

It is a further object of the present invention to place the resin pellets into a tumbling device such as a cement mixer while they are being coated with hot melted beeswax, so that the coating of hot melted beeswax on the pellets will be even and smooth so that the resin pellets will be evenly coated with beeswax.

It is an additional object of the present invention, to cause the resin pellets which are evenly coated with hot melted beeswax to travel from the tumbling device to a tubular elongated barrel having a resin delivery screw which transports the beeswax coated resin pellets into the cavities of a mold after the mold has been closed, so that when the cavities of the mold are fully filled with the beeswax coated resin pellets and the cavities of the mold are caused to form the foundation, foundation with border, or honeycomb, the final formed foundation, foundation with border or honeycomb will be molded with the beeswax impregnated and admixed therein. As a result, the bees will be attracted to the final molded product and will thereafter for a foundation will create a honeycomb and deposit eggs and honey in the formed honeycomb or for a formed honeycomb will directly lay their eggs and honey in the fully formed honeycomb, and the requirement to spray the foundation or the honeycomb with beeswax to attract the bees is eliminated.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated:

FIG. 1A is a perspective view of the first steps of the present invention process which involves melting a slab of beeswax so that it becomes a liquid and thereafter forcing the melted beeswax into an applicator such as a glue gun;

FIG. 1B is a perspective view of the next steps of the present invention process which involves placing the resin pellets used to form the foundation, foundation with border, or honeycomb into a tumbling device such as a cement mixer and spraying hot melted beeswax from the glue gun onto the resin pellets while they are being tumbled to thereby provide a smooth even coating of beeswax on each resin pellet;

DETAILED DESCRIPTION OF THE PREFERRED EMBODIMENTS

Figure 1C:
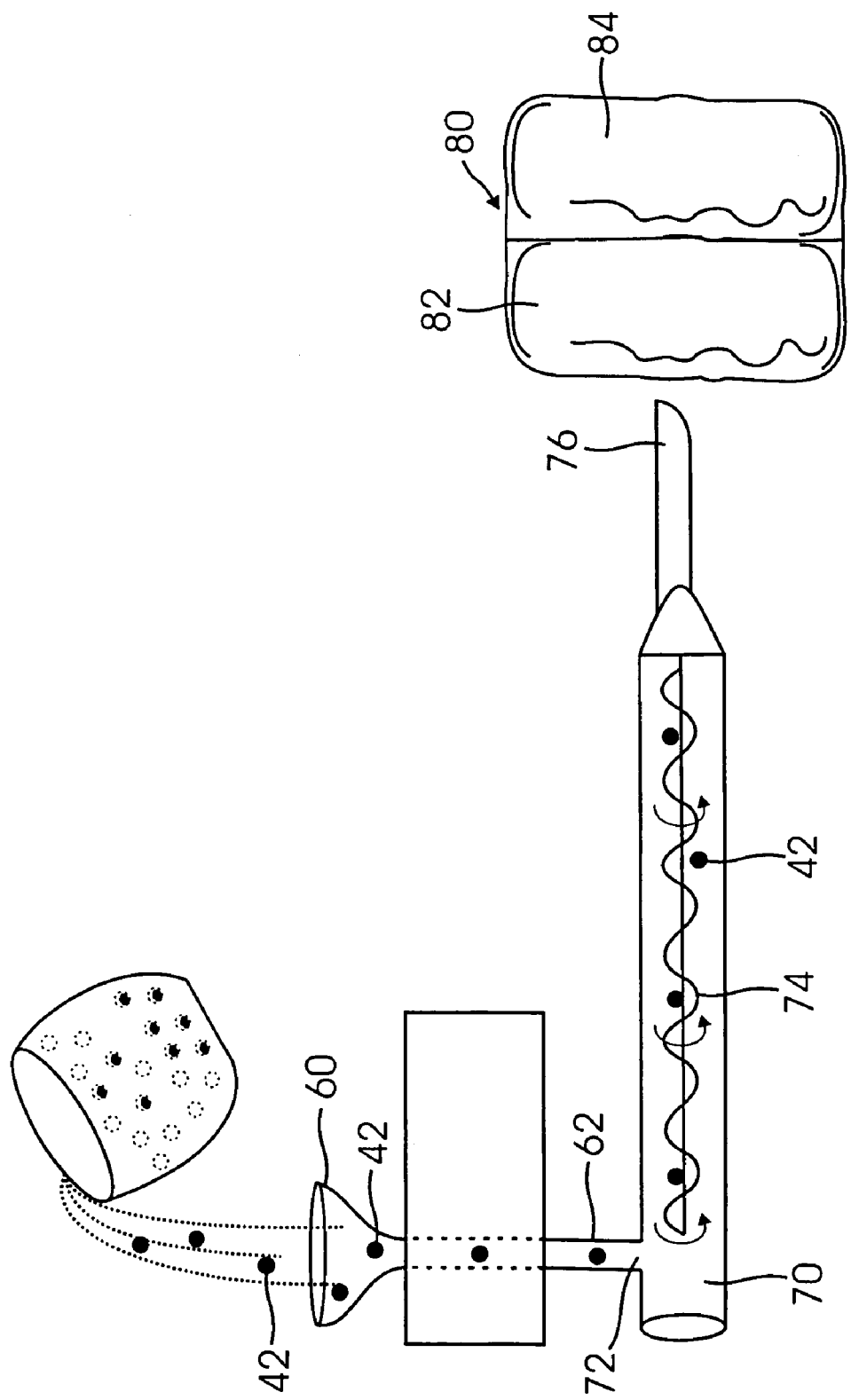
FIG. 1C is a perspective view of the final steps of the present invention process which involves causing the beeswax coated resin pellets to go through a hopper and into an elongated tubular feed device which has a rotating feed screw therein which delivers the beeswax coated resin pellets into the cavities of a two part mold after the mold has been closed, which cavities have the shape of the foundation, foundation with border, or honeycomb therein and causing the cavities of the mold to form the final foundation, foundation with border, or honeycomb with beeswax admixed and formed therein.

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

Referring to FIG. 1A, the first step in the present invention process is to obtain a slab of beeswax 10 which is its hardened state and place the slab of beeswax 10 into a receptacle 20 which has a source of heat 22 so that the beeswax is melted into a hot liquid state 12. By way of example, the beeswax 12 can be melted at a temperature of approximate 200 degrees Fahrenheit. Once the beeswax 10 is melted into a hot liquid state 12, it is then forced under pressure by a pump 24 through a conduit 26 from the heating receptacle or heated tank 20 through a conduit 26 into an applicator 30 which by way of example can be a glue gun.

The applicator or glue gun 30 has a hot spray head 32 which is heated to ensure that the beeswax will not crystallize within the spray gun 30 but will flow through it like a liquid.

Referring to FIG. 1B, the next step in the process is to place the plastic pellets 40 which will be used to form the molded foundation, foundation with border or honeycomb into a tumbling device 50 which by way of example can be a cement mixer. The pellets 40 can be resin, polyethylene, polyurethane, or any other hard high strength moldable plastic material. As the pellets 40 are being tumbled in the tumbler 50 the liquid melted hot beeswax 12 is sprayed onto the pellets 40 from the hot spray head 32 of the applicator 30 so that the hot liquid beeswax 12 is evenly coated onto the pellets 40. By achieving the coating of hot liquid beeswax 12 with a spray rather than just dumping the pellets into molten hot beeswax, each pellet 40 is evenly coated with beeswax 12 while the pellets 40 are being tumbled. The preferred ratio of beeswax to pellets for a foundation is three (3) pounds of beeswax 12 to one-hundred (100) pounds of pellets 40. The preferred ratio of beeswax to pellets for a full honeycomb is two (2) pounds of beeswax 12 to one-hundred (100) pounds of pellets 40.

If the ratio of beeswax to pellets is higher, the strength and cohesiveness of the resin pellets will be adversely diluted. The present invention process requires as much strength as possible for the pellets while at the same time having sufficient impregnation of beeswax to attract bees to the finished product.

Referring to FIG. 1C, after the pellets 40 are evenly coated with liquid beeswax 12, they are then caused to travel from the tumbler 50 into an injection mold feeding means which by way of example can be a hopper 60 which has a throat 62 which leads to an elongated barrel 70 which has rotating delivery screw 74. The beeswax coated pellets 42 enter the hopper 60 and are guided through the hopper's throat 62 into an opening 72 in the elongated barrel 70 so that the beeswax coated pellets 42 are moved longitudinally by the rotating delivery screw. At the remote end 76 of the elongated barrel 70, the barrel 70 has an opening 78 which leads into an injection mold which by way of example can be two cavity mold 80 which has a first cavity 82 and second cavity 84. The cavities of the mold 80 are formed in the shape of the desired product to be molded. After the mold 80 is closed, the beeswax coated pellets 42 are injected into the cavities 82 and 84 until the cavities are filled with the injection molded beeswax 42. Then heat and pressure is applied into the mold so that the final molded product is formed. The two cavity halves 82 and 84 are then opened and the final molded product removed form the mold 80.

As a result, because the beeswax 12 is coated onto the resin pellets 40 and the coated resin pellets 42 are an integral combination of resin 40 and beeswax 12, when the molding takes place, the final molded product is molded with the beeswax being an integral part of the final molded product.

Figure 2:
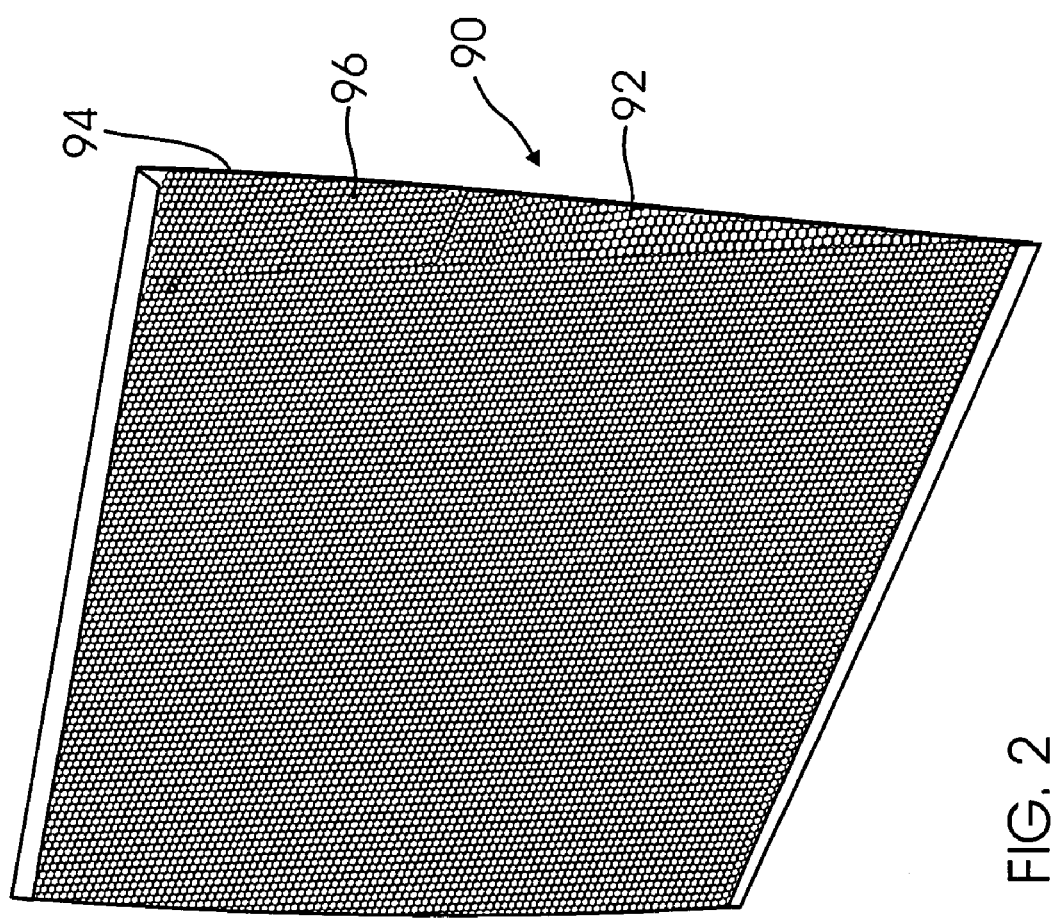
FIG. 2 is a perspective view of the final formed foundation with beeswax formed therein.

The present invention is used to mold three different types of products. Referring to FIG. 2, one product is a foundation 90 which is a flat piece of molded resin impregnated with beeswax with opposite parallel flat walls 92 and 94 having a multiplicity of openings 96 (openings in the other side 94 not shown) respectively formed within each respective flat wall 92 and 94. The foundation 90 is placed into a beehive. Because the molded foundation 90 is impregnated with beeswax, the bees will automatically be attracted to the foundation 90 within a beehive. The bees will then form the honeycomb onto the respective multiplicity of openings 96 and (openings in other side 94 not shown) of the two walls 92 and 94 of the foundation 90 and thereafter, lay their eggs and honey within the formed honeycomb. One problem with just using a foundation is that the bees will expend a lot of energy and honey to make the honeycomb and only after the honeycomb is completed will the bees begin to lay their eggs and honey within the formed honeycomb.

Figure 3:
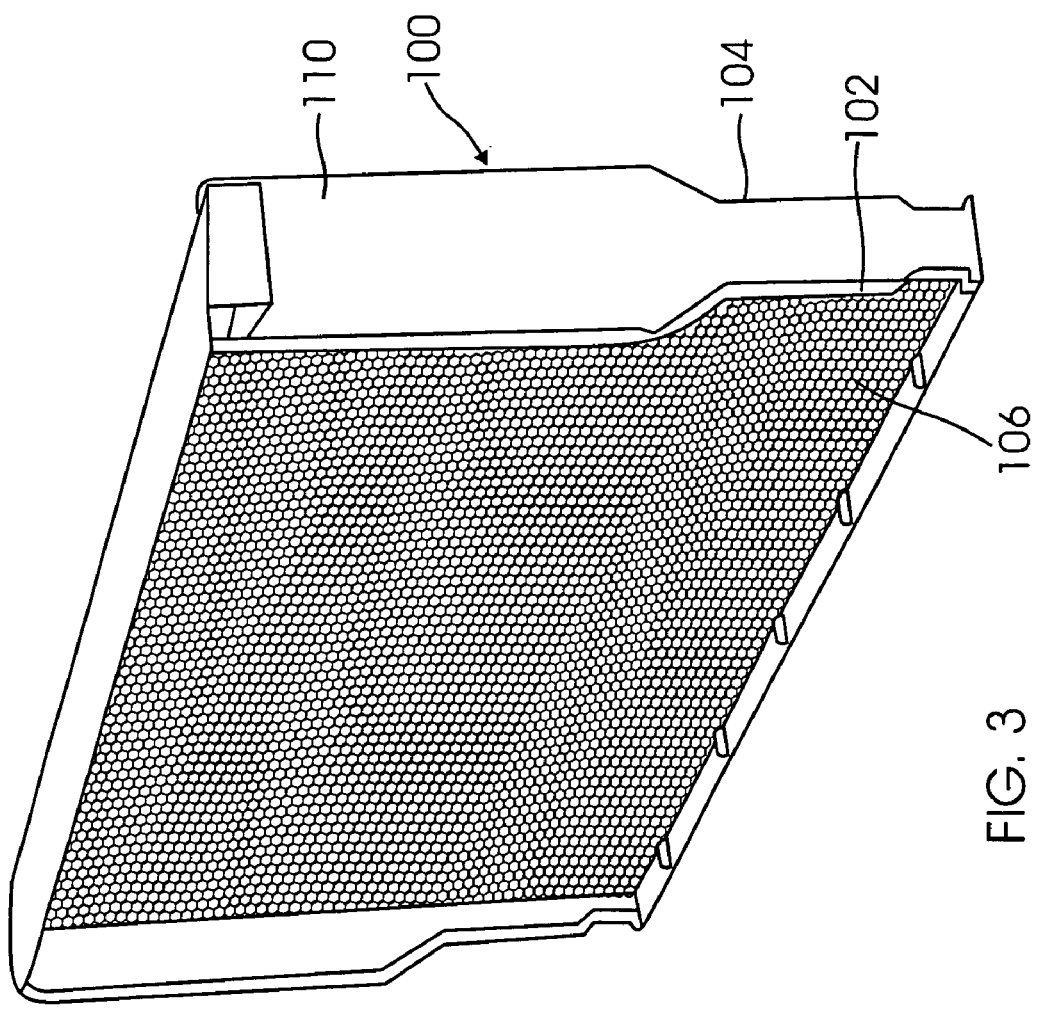
FIG. 3 is a perspective view of the final formed foundation with border with beeswax formed in the foundation.

Referring to FIG. 3, a second embellished product which is formed by the present invention process is a foundation 100 with a molded border 110 which makes it easier to place the foundation with border into a beehive. The foundation 100 with molded border 110 is a flat piece of molded resin impregnated with beeswax with opposite parallel flat walls 102 and 104 having a multiplicity of openings 106 and (openings of the other side 104 not shown) respectively formed within each respective flat wall 102 and 104. The border 110 surrounds the foundation 110 as illustrated. The border is also impregnated with beeswax and therefore, only coated pellets are also used to fill the portion of the cavities used to form the border. The foundation 100 with border 110 is placed into a beehive. Because the molded foundation 100 is impregnated with beeswax, the bees will automatically be attracted to the foundation 100 within a beehive. The bees will then form the honeycomb onto the respective multiplicity of openings 106 (openings of the other side 104 not shown) of the two walls 102 and 104 of the foundation 100 and thereafter, lay their eggs and honey within the formed honeycomb. One problem with just using a foundation even with a border is that the bees will expend a lot of energy and honey to make the honeycomb and only after the honeycomb is completed will the bees begin to lay their eggs and honey within the formed honeycomb.

Figure 4:
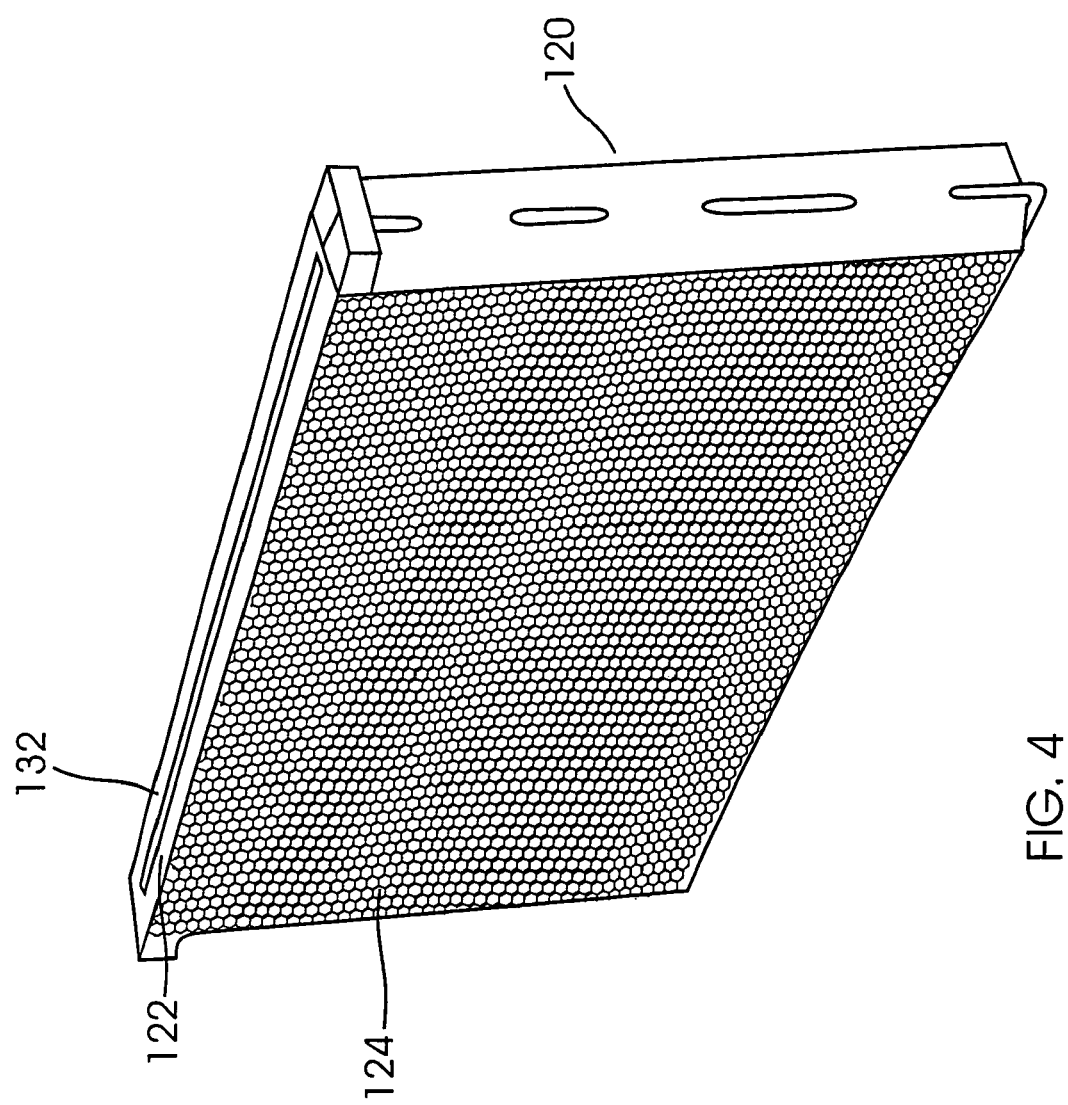
FIG. 4 is a perspective view of the final formed honeycomb with beeswax formed therein.

Referring to FIG. 4, the third product which is formed by the present invention process is a honeycomb 120. The physical characteristics of the honeycomb are described in U.S. Pat. No. 4,374,440 issued to Herbert Drapkin on Feb. 22, 1983 for "Honeycomb". Dr. Drapkin who was the inventor of the honeycomb patent in U.S. Pat. No. 4,374,440 is also the inventor of the present invention. The molded honeycomb 120 has two substantially identical half sections 122 and 132 each having a respective front face 124 with each front face including a plurality of regularly spaced hexagonally shaped cells sloping downward at an angle between 10 degrees and 15 degrees and preferably at 12.5 degrees which is substantially equal to the angle of a natural honeycomb cell, as described in U.S. Pat. No. 4,374,440. The molded resin honeycomb 120 is impregnated with beeswax so that the honeycomb cells on the outer walls 124 of the honeycomb are all impregnated with beeswax.

As a result, the bees will be automatically attracted to the honeycomb 120 and will lay their eggs and honey into the cells of the honeycomb 120. The benefit of the molded honeycomb 120 is that the bees will not have to spend energy and honey to make a honeycomb since the honeycomb is already formed. Therefore, the molded honeycomb will result in the production of more eggs and honey in a far more rapid manner than just using a foundation. With the cells being at an angle, the honey will not fall out of the cells of the honeycomb but will remain in the cells of the honeycomb.

For the preferred resin 40 of the present invention, a 24 melt high density polyethylene is used. The preferred range of resin is 20 to 30 melt high density polyethylene.

The 24 melt is preferred as the finished product will not be too soft and will not be too brittle.

By using a high density polyethylene to form the honeycomb, the honeycomb can withstand higher centrifugal forces to remove the honey from the honeycomb. The honeycomb filled with honey is placed in a centrifuge and rotates at 1300 rpm to cause the honey to fly out of the honeycomb and onto the centrifuge walls where it drips down and is subsequently collected in a receiving tank. By being to rotate the honeycomb at this high rpm, it takes 30 second to extract the honey from a honeycomb. With conventional honeycombs entirely formed of beeswax, they can only be spun at a much lower rpm and it will take 30 minutes to extract the honey from the honeycomb.

Defined in detail, the present application is a process for forming a plastic product to be used in beekeeping, comprising: (a) obtaining a slab of beeswax which is in a hardened state and placing the slab of beeswax into a receptacle which has a source of heat so that the slab of beeswax is melted into a hot liquid state; (b) forcing the hot melted beeswax under pressure into an applicator which has a hot spray head so that the beeswax can be sprayed from the applicator and not crystallize in the applicator; (c) placing plastic pellets used to form the plastic product into a tumbling device and spraying the hot liquid beeswax from the applicator onto the pellets while the pellets are being tumbled so that the pellets are evenly coated with hot liquid beeswax; (d) closing a mold of an injection molding machine, the mold having cavities which are formed into a shape of a final finished plastic product and causing the hot liquid beeswax coated pellets to be placed into an injection molding feeding device which in turn causes the hot liquid beeswax coated pellets to be placed into cavities of the injection molding machine; and (e) opening the mold after a final finished product is formed wherein the final finished product is made of plastic impregnated throughout with beeswax.

Defined broadly, the present invention is a process for forming a plastic product to be used in beekeeping, comprising: (a) obtaining a slab of beeswax which is in a hardened state and melting the beeswax into a liquid state; (b) pouring the melted beeswax into an applicator; (c) placing plastic pellets used to form the plastic product into a tumbling device and spraying the beeswax from the applicator onto the pellets while the pellets are being tumbled so that the pellets are evenly coated with liquid beeswax; (d) closing a mold of an injection molding machine, the mold having cavities which are formed into a shape of a final finished plastic product and causing the liquid beeswax coated pellets to be placed into an injection molding feeding device which in turn causes the liquid beeswax coated pellets to be placed into cavities of the injection molding machine; and (e) opening the mold after a final finished product is formed wherein the product is made of plastic impregnated throughout with beeswax.

Of course the present invention is not intended to be restricted to any particular form or arrangement, or any specific embodiment, or any specific use, disclosed herein, since the same may be modified in various particulars or relations without departing from the spirit or scope of the claimed invention hereinabove shown and described of which the apparatus or method shown is intended only for illustration and disclosure of an operative embodiment and not to show all of the various forms or modifications in which this invention might be embodied or operated.

What is claimed is:

1. A process for forming a plastic product to be used in beekeeping, comprising:
   a. obtaining a slab of beeswax which is in a hardened state and placing the slab of beeswax into a receptacle which has a source of heat so that the slab of beeswax is melted into a hot liquid state;
   b. forcing the hot melted beeswax under pressure into an applicator which has a hot spray head so that the beeswax can be sprayed from the applicator and not crystallize in the applicator;
   c. placing plastic pellets used to form the plastic product into a tumbling device and spraying the hot liquid beeswax from the applicator onto the pellets while the pellets are being tumbled so that the pellets are evenly coated with hot liquid beeswax;
   d. closing a mold of an injection molding machine, the mold having cavities which are formed into a shape of a final finished plastic product and causing the hot liquid beeswax coated pellets to be placed into an injection molding feeding device which in turn causes the hot liquid beeswax coated pellets to be placed into cavities of the injection molding machine; and
   e. opening the mold after a final finished product is formed wherein the final finished product is made of plastic impregnated throughout with beeswax.

2. The process in accordance with claim 1, wherein the cavities of the mold are formed in the shape of a foundation to be used in beekeeping and the final finished product is a fully formed beekeeping foundation made of plastic impregnated throughout with beeswax.

3. The process in accordance with claim 2, wherein the ratio of hot liquid beeswax to plastic pellets is approximately three pounds of hot liquid beeswax to one hundred pounds of plastic pellets.

4. The process in accordance with claim 1, wherein the cavities of the mold are formed in the shape of a foundation to be used in beekeeping with a border surrounding the foundation with coated plastic pellets placed in the portion of the cavities comprising the border and the final finished product is a fully formed beekeeping foundation made of plastic impregnated throughout with beeswax and surrounded by a formed plastic border impregnated with beeswax.

5. The process in accordance with claim 4, wherein the ratio of hot liquid beeswax to plastic pellets used to form the foundation portion is approximately three pounds of hot liquid beeswax to one hundred pounds of plastic pellets.

6. The process in accordance with claim 1, wherein the cavities of the mold are formed in the shape of a fully formed honeycomb structure to be used in beekeeping and the final finished product is a fully formed beekeeping honeycomb made of plastic impregnated throughout with beeswax.

7. The process in accordance with claim 6, wherein the ratio of hot liquid beeswax to plastic pellets is approximately two pounds of hot liquid beeswax to one hundred pounds of pellets.

8. The process in accordance with claim 1, wherein the plastic pellets used are in the range of 20 melt to 30 melt high density polyethylene.

9. The process in accordance with claim 1, wherein the plastic pellets used are 24 melt high density polyethylene.

10. The process in accordance with claim 1, wherein the beeswax is melted at a temperature of approximately 200 degrees Fahrenheit.

11. The process in accordance with claim 1, wherein the applicator is a glue gun having a heated spray head.

12. The process in accordance with claim 1, wherein the injection molding feeding device comprises a hopper to receive the hot liquid beeswax coated pellets and a throat which guides the pellets into a barrel having a rotating screw drive which causes the pellets to travel along the rotating screw drive and into the cavities of the mold.

13. A process for forming a plastic product to be used in beekeeping, comprising:
   a. obtaining a slab of beeswax which is in a hardened state and melting the beeswax into a liquid state;
   b. pouring the melted beeswax into an applicator;
   c. placing plastic pellets used to form the plastic product into a tumbling device and spraying the beeswax from the applicator onto the pellets while the pellets are being tumbled so that the pellets are evenly coated with liquid beeswax;
   d. closing a mold of an injection molding machine, the mold having cavities which are formed into a shape of a final finished plastic product and causing the liquid beeswax coated pellets to be placed into an injection molding feeding device which in turn causes the liquid beeswax coated pellets to be placed into cavities of the injection molding machine; and
   e. opening the mold after a final finished product is formed wherein the final finished product is made of plastic impregnated throughout with beeswax.

14. The process in accordance with claim 13, wherein the cavities of the mold are formed in the shape of a foundation to be used in beekeeping and the final finished product is a fully formed beekeeping foundation made of plastic impregnated throughout with beeswax.

15. The process in accordance with claim 14, wherein the ratio of hot liquid beeswax to plastic pellets is approximately three pounds of hot liquid beeswax to one hundred pounds of plastic pellets.

16. The process in accordance with claim 13, wherein the cavities of the mold are formed in the shape of a foundation to be used in beekeeping with a border surrounding the foundation with coated plastic pellets placed in the portion of the cavities comprising the border and the final finished product is a fully formed beekeeping foundation made of plastic impregnated throughout with beeswax and surrounded by a formed plastic border impregnated with beeswax.

17. The process in accordance with claim 16, wherein the ratio of hot liquid beeswax to plastic pellets used to form the foundation portion is approximately three pounds of hot liquid beeswax to one hundred pounds of plastic pellets.

18. The process in accordance with claim 13, wherein the cavities of the mold are formed in the shape of a fully formed honeycomb structure to be used in beekeeping and the final finished product is a fully formed beekeeping honeycomb made of plastic impregnated throughout with beeswax.

19. The process in accordance with claim 18, wherein the ratio of hot liquid beeswax to plastic pellets is approximately two pounds of hot liquid beeswax to one hundred pounds of pellets.

20. The process in accordance with claim 13, wherein the plastic pellets used are in the range of 20 melt to 30 melt high density polyethylene.

21. The process in accordance with claim 13, wherein the plastic pellets used are 24 melt high density polyethylene.

22. The process in accordance with claim 13, wherein the beeswax is melted at a temperature of approximately 200 degrees Fahrenheit.

23. The process in accordance with claim 13, wherein the applicator is a glue gun having a heated spray head.

24. The process in accordance with claim 13, wherein the injection molding feeding device comprises a hopper to receive the hot liquid beeswax coated pellets and a throat which guides the pellets into a barrel having a rotating screw drive which causes the pellets to travel along the rotating screw drive and into the cavities of the mold.

* * * * *